United States Patent [19]

Puchalski

[11] 4,440,647
[45] Apr. 3, 1984

[54] PAINT SPRAY BOOTH DETACKIFICATION COMPOSITION AND METHOD

[75] Inventor: Walter J. Puchalski, Southampton, Pa.

[73] Assignee: Betz Laboratories, Inc., Trevose, Pa.

[21] Appl. No.: 465,224

[22] Filed: Feb. 9, 1983

[51] Int. Cl.³ .................. B01D 21/01; C02D 1/20; C09D 9/00; C09K 3/00
[52] U.S. Cl. ..................... 210/712; 134/10; 134/38; 252/180; 252/181; 252/DIG. 8; 210/725; 210/728; 210/736; 55/84; 55/85; 55/89
[58] Field of Search ............ 134/10, 38; 210/723, 210/724, 735, 736, 712, 728; 252/180, 181, DIG. 8; 55/84, 85, 89

[56] References Cited

U.S. PATENT DOCUMENTS

| | | | |
|---|---|---|---|
| 2,926,154 | 2/1960 | Keim | 524/607 |
| 3,861,887 | 1/1975 | Forney | 55/19 |
| 3,951,921 | 4/1976 | Espy | 210/735 X |
| 3,990,869 | 11/1976 | Forney | 55/19 |
| 3,990,986 | 11/1976 | Gabel | 252/315 |
| 4,002,490 | 1/1977 | Michalski | 134/38 |
| 4,005,495 | 10/1977 | Gabel | 252/327 X |
| 4,067,806 | 1/1978 | Mauceri | 134/38 X |
| 4,096,061 | 6/1978 | Brennan | 427/345 X |
| 4,130,674 | 12/1978 | Roberts | 427/331 |
| 4,185,970 | 1/1980 | Dean | 55/89 |

*Primary Examiner*—Dennis L. Albrecht
*Attorney, Agent, or Firm*—Alexander D. Ricci; Bruce E. Peacock

[57] ABSTRACT

Paint spray booth detackification compositions and methods. The compositions comprise a water dispersible polyamide-epichlorohydrin resin, a polymer formed by reaction of hexamethylene diamine and ethylene dichloride, and an amphoteric metal salt. These compositions are introduced into a paint spray booth water wash system so as to detackify oversprayed paint.

8 Claims, No Drawings

PAINT SPRAY BOOTH DETACKIFICATION COMPOSITION AND METHOD

FIELD OF THE INVENTION

This invention relates to an improved method and composition for treating paint wastes and paint oversprays encountered in paint spray booths or any areas where these wastes and oversprays exist.

BACKGROUND OF INVENTION

Spray painting of automobile bodies, truck engines, appliances, and other industrial goods is customarily carried out in enclosed areas called paint spray booths (PSB). These booths act both to contain any fumes or oversprayed paint and to reduce the chances of dust contamination. These booths vary in size, but are somewhat basic in their design and operation. A typical booth would thus consist of a work area, back section with mist eliminators, and a sump.

The units to be painted generally pass through the work area while an airflow makes the oversprayed paint contact either the sump water or the spray from the water curtain. The air is scrubbed with recirculated water at the water curtain, passes through the mist eliminators, and is removed by an exhaust fan.

Because roughly one-half of all paint sprayed does not reach its intended article, a significant concentration of paint builds in the system and agglomeration can occur. The resultant mass is a sticky, tacky material which can plug the mist eliminators, shower heads, and even recirculating pumps. When this happens, scrubbing efficiency decreases leading to potentially hazardous conditions of unchecked paint emissions being discharged into the atmosphere.

This process involves other problems. These tacky organic deposits are subject to anaerobic bacterial growth which generates corrosion and odor problems. In addition, the paint solids which are recirculated can form suspensions in the water. They remain tacky and can create expensive separation and disposal problems.

These problems show, therefore, the desirability to treat PSB water systems so as to reduce or prevent as much as possible, the agglomeration and deposition of oversprayed paint on critical PSB operation parts; to render the resultant sludge non-tacky and easily removable; and to provide a water quality such that it can be recycled for use in the system.

PRIOR ART

Many compositions and methods have been tried in an effort to reduce these problems. One of the first of these processes is disclosed in U.S. Pat. No. 2,585,407. This disclosure acknowledges the then conventional practice of allowing the overspray to come in contact with water treated with caustic to a pH above 8. The paint eventually settles by gravity to the bottom of the sump where it is eventually removed by shovelling the sticky residue from the sump. This method eventually was considered unacceptable and as a result, more sophisticated chemical treatments have been developed to separate the paint from the water and turn it into a non-tacky, or detackified, solid which does not cause the aforementioned problems.

As early as 1965, the use of cationic polymers in combination with ferric chloride was proposed in order to treat suspended matter comprising water and oil based paints. See R. F. Day, *Industrial Water Engineering*, July 1965. Subsequent teachings have proposed the use of many and varied types of cationic polymers for the purpose of coagulating paint wastes. For instance, in Forney U.S. Pat. No. 3,861,887, cationic water dispersible polymers, such as, inter alia, precondensates of polyalkylene polyamine and polyoxyalkylene glycols, are disclosed as being effective paint waste coagulants. As an improvement, U.S. Pat. No. 4,002,490 (Michalski) discloses that polypropylene glycols were found to increase the operational efficiency of paint and lacquer detackifying compositions having cationic polymer and amphoteric metal salt components.

In similar fashion, U.S. Pat. No. 3,990,986 (Gabel) teaches paint spray booth detackifying compositions comprising water soluble metal salts, a lower aliphatic amino alcohol, and a reaction product formed from polyalkylene oxide, epichlorohydrin and lower aliphatic amine reaction.

Other patents of interest to the field of paint spray booth detackifying compositions and methods include U.S. Pat. Nos. 3,429,823 (Cataneo); 4,067,806 (Manceri); 4,220,456 (Block); 3,990,869 (Forney); 2,739,903 (Arnold); 3,173,879 (Arnold et al); 3,515,575 (Arnold); 3,985,922 (Thornton et al); 4,055,404 (Daimer); 4,055,495 (Gabel); 4,130,674 (Roberts et al); and 4,153,548 (Forney).

While these and other processes and compositions have shown considerable acceptance for overspray detackification, they are either not applicable to all paints or they do not attain optimal detackification performance with the paints on which they are used. It is therefore beneficial to the art to develop superior compositions for paint detackification.

Accordingly, it is highly desirable to provide improved, new and useful compositions for the detackification of paint overspray. It is even more desirable to provide such a detackification treatment that is efficacious on water-based paints, oil-based paints, lacquers and enamels.

DESCRIPTION OF THE INVENTION

In accordance with the invention, it has been discovered that the combination of a water dispersible polyamide-epichlorohydrin resin, a water dispersible ethylene dichloride-hexamethylene diamine condensation polymer, and an amphoteric metal salt, effectively detackifies water-based paints, oil-based paints, lacquers and enamels.

Paint is a broad-based term used to describe the coating applied to a given object. Paints are normally composed of a film former (the resin which forms the coating), a solvent or carrier (water or oil); pigments (for color), and additives such as biocides, drying agents, viscosity modifiers, etc. In general, the solvent is used to classify the paint type: either water base or oil base. Technically, if the paint forms its coating by evaporation of the solvent without chemical reaction, it is a lacquer. If the coating is formed via cross-linking, it is an enamel.

As to the polyamide-epichlorohydrin resins (hereinafter PAEH) which may be used, these may be made in accordance with U.S. Pat. No. 2,926,154 (Keim). The entire disclosure of this patent is hereby incorporated by reference. These cationic resins are water-soluble and may be generally described as being a polymeric reaction product of epichlorohydrin and a polyamide derived from a polyalkylene polyamine and a dicarboxylic acid. Such polymers having a number average molecular weight of between about 5,000-100,000 may be suitably employed in accordance with the invention.

As the Keim patent indicates, in the formation of these resins, the dicarboxylic acid is normally first reacted with the requisite polyalkylene polyamine under reaction conditions which produce a water soluble polyamide. The polyamide is then reacted with epichlorohydrin so as to form the polyamide-epichlorohydrin resins which are to be used in the invention.

Exemplary dicarboxylic acids which may be used in the preparation of PAEH include diglycolic, malonic, succinic, glutaric, adipic, etc. Adipic acid is preferred.

As to the polyalkylene polyamines which may be used to form the desired PAEH, polyethylene amines, polypropylene amines, and polybutylene amines may be mentioned. Diethylenetriamine is preferred.

The preferred PAEH resin is a epichlorohydrin cross-linked polyamide formed from diethylenetriamine and adipic acid. One such preferred PAEH resin is commercially available from Hercules under the trademark Reten 763. This product is available in an aqueous solution containing 35 weight % actives. The product exhibits a Brookfield viscosity at 25° C. of 150-300 cps and has a specific gravity at 25/15.6° C. of about 1.12.

The other polymeric component of the detackification composition of the present invention is an ethylene dichloride crosslinked polyamine of hexamethylene diamine still bottoms (HMD/EDC). One such polymer is commercially available under the trademark Santofloc F from Monsanto. This particular product is preferred for use and is available in a 25% actives aqueous solution. It has a molecular weight within the range of about 2,000-5,000.

As to the amphoteric metal salt component of the detackification treatment of the present invention, zinc chloride is preferred. However, other electrolytes such as ferric chloride, lanthanum chloride, aluminum chloride and other soluble zinc salts may also be used.

Compositions in accordance with the invention comprise: (on a 100% actives basis) about 3-15% by weight HMD/EDC; about 2-6% by weight PAEH; about 3-10% amphoteric salt; remainder water. The preferred embodiment is 10% HMD/EDC, 4.7% PAEH; 8.0% zinc chloride, remainder water.

In those instances in which it is desired to detackify oil based paints, optimal performance is achieved by adding a sufficient amount of sodium metasilicate to the system, in addition to the above-noted composition, so that the pH of the system is raised to above 7 and preferably to about 10.5-11.8.

With respect to water-base paints, optimal detackification occurs at pH of around 6-7.

It is to be noted that in order to maintain compatibility of the two polymer components of the invention, the Zn Cl$_2$ level in the treatment should be maintained at lower than about 9.0%.

The following examples amply demonstrate that the compositions of the present invention may be successfully utilized in processes of the type which are directed toward the inhibition of pollution and/or contamination in PSBS. In these types of water wash systems, the water is used to wash air in the booth and to remove oversprayed paints, enamels or lacquers. Solids may be removed by conventional techniques via filters, etc. The water is normally recirculated so that it may once again perform its intended washing function. Upon treatment with the detackification compositions of the invention, the tackiness of the paints, enamels and lacquers is reduced and therefore, to the extent that these paints, enamels and lacquers are not separated from the liquid phase, they exhibit less tendency to adhere to the integral parts of the pumps, mist eliminators or sump sidewalls of the spray booths. Further, the coagulant function of the detackification compositions facilitates removal of these waste paint solids from the water so that relatively clean water can be recirculated in the system. Another important function of the treatment of the present invention is to reduce the volume of the resultant sludge.

From about 1-25% (by weight) of the detackification compositions (based upon the weight of oversprayed paint) can be admitted in the paint spray booth system at varied locations including: the sump, upstream from pumps, or at any advantageous position along the circulating water system.

Inclusion of the PAEH component in the treatment unexpectedly renders the HMD/EDC polymer compatible with the previously incompatible amphoteric metal salts. Accordingly, use of the PAEH component allows the formulation of a multi-ingredient product comprising previously incompatible elements, while maintaining the beneficial effect of each component.

SPECIFIC EMBODIMENTS

The invention will now be further described with reference to a number of specific examples which are to be regarded solely as illustrative, and not as restricting the scope of the invention.

In order to assess the effectiveness of the paint spray booth detackifying compositions of the present invention, the desired test paints were added to an aqueous medium containing the detackification compositions. Upon addition of the desired paint, the mixture was agitated and then allowed to settle. A scale of from 1 (poor) to 5 (excellent) was then used to denote certain detackifying characteristics such as resulting water clarity, paint adhesion to the mixer blades, the tackiness of the resulting paint agglomeration and the settled formed floc. The example parameters are set out below with results being given in the table. As the table indicates, two control examples were also run. In these control runs, the procedures given in Examples 1 and 2 respectively were followed with the exception that no detackifying composition was added.

Example 1

0.125 ml of a solution comprising: 10 weight % (100% actives) of a ethylene dichloride cross-linked hexamethylenediamine polymer (Santofloc F - Monsanto), 3.5 weight % (100% actives) of a polyamide-epichlorohydrin condensation polymer (Reten 763 - Hercules), 5% weight zinc chloride, remainder water; was added to 500 ml of tap water. 2.5 ml of a water-based paint was then added to the resulting mixture. The mixture was stirred for approximately 1 minute and was then allowed to settle.

Example 2

The same composition recited in Example 1 was used as a detackifying composition. The pH of the aqueous medium was, however, raised to pH 10 via caustic addition. 2.5 ml of an oil-based paint were added in lieu of the water-based paint of Example 1.

Example 3

The test was the same as that given in Example 2 save that a sodium silicate salt was used in place of caustic so as to raise the pH of the aqueous mixture to about 10.

Comparative Example One

The test parameters given above in Example 3 were utilized. However, as a detackifying composition, a composition comprising 0.05 ml of a 25% actives solution of HMD/EDC (Santofloc F, Monsanto) and 1 ml of (10 weight % solution) zinc chloride, was used. Comparison should be made between the results of this Comparative Example One and Example 3.

Comparative Example Two

Again, the test parameters above in Example 3 were utilized. However, as a detackifying composition, 0.05 ml of a 35% actives solution of PAEH (Reten 763, Hercules) 1 ml of (10 weight % solution) zinc chloride, was used. The results of this comparative example should be contrasted with those of Example 3.

Comparative Example Three

The test parameters given above in Example 3 were again utilized. For this example, however, no polymers were utilized in the test detackifying composition. Instead, 0.15 ml of zinc chloride (10% weight) was used as detackifying treatment. Results of this comparative example are to be contrasted with those of Example 3.

Example 4

The test parameters given in Example 3 were followed with the exception that 2.5 ml of a polyurethane primer was used as the test paint. The detackifying composition comprised: 10 weight % (100% actives) HMD/EDC polymer (Santofloc F), 4.7 weight % (100% actives) PAEH (Reten 763), 8 weight % zinc chloride, remainder water. 0.125 ml of the detackifying composition was added to the paint-containing solution.

Comparative Example Four

In order to contrast the efficacy of the detackifying compositions of the present invention with a composition presently used in industry, the performance of Nalco 8722 (polyamine, alkanolamine, and zinc salt) was contrasted with that of the composition of Example 4. Oil based paint was used as the test paint, and, similar to Example 3, silicate was used as the alkaline agent. As a result of this test, it was ascertained that about 1500-2000 ppm of the Nalco product was needed to give results comparable to those obtained by 250 ppm of the composition of Example 4

TABLE

| | | Test Results | | | |
|---|---|---|---|---|---|
| Additive | Paint Type | Water Clarity | Paint Adhesion To Blades | Paint/Sludge Tackiness | Floc Settling |
| None | water-base | 1 | 5 | 5 | 1 |
| None | oil-base | 3 | 1 | 1 | 1 |
| Example 1 | water-base | 5 | 5 | 5 | 5 |
| Example 2 | oil-base | 3 | 3 | 2 | 1 |
| Example 3 | oil-base | 5 | 5 | 4 | 5 |
| Comparative Example Two | oil-base | 4 | 3 | —* | 5 |
| Comparative Example One | oil-base | 3 | 5 | — | 5 |
| Comparative Example Three | oil-base | 3 | 3 | — | 3 |
| Example 4 | polyurethane primer | 5 | 5 | — | 5 |

— indicates data not taken

FIELD TESTS

The detackifying composition of the present invention has also been successfully tested at several industrial paint spray booth locations. For instance, at one location, the paint overspray comprised water-dispersible polystyrene resin and iron oxide pigments. The detackifying composition used to treat these wastes is detailed in Example 4 herein. The detackifying composition was fed to the sump at a rate of 6–9% (weight) of the estimated overspray paint.

Over two months of testing, no negative effects were noticed. System pump outages due to poor paint kill were reduced from two per month to zero, clean-up time was reduced. The sludge was effectively killed and the system water was made significantly cleaner. The product outperformed the previously used detackifying treatment.

At another paint spray booth system location, solvent-based phthalic anhydride resin and carbon black pigment were contained in the paint overspray. This particular paint spray booth system had two sumps. One system side was treated with a composition comprising PAEH, HMD/EDC, Zn Cl$_2$, and sodium metasilicate. The other system side was left untreated. After four months the untreated side had significant paint deposits, pluggages and outages. The treated side exhibited little or none of these problems. A thick paint skin formed on the water of the untreated side. In contrast, the treated side remained free-flowing and the sludge had the tackiness and consistency of wet sand.

DISCUSSION

Comparative Example Four clearly demonstrates that the detackifying composition of the present invention is capable of providing detackifying results at least comparable to those attendant upon use of a commercially available detackifying composition, but at significantly lower treatment dosage.

Comparison between Example 3 and Comparative Examples One, Two, and Three is indicative of the fact that superior results are obtained when the PAEH, HMD/EDC, and zinc chloride components are combined in a detackifying composition (Example 3) in contrast to when each of the components is used, singly, as a detackifier.

The noted field tests indicate that the compositions of the present invention are effective in detackifying paint wastes generated from various industries.

While we have shown and described herein certain embodiments of the present invention, it is intended that there be covered as well any change or modification therein which may be made without departing from the spirit and scope of the invention as defined in the appended claims.

We claim:

1. A composition for the detackification and clarification of paint spray booth paint wastes comprising, on a 100% actives basis:
   a. about 3–15% by weight of a polymer formed by reaction of hexamethylene diamine and ethylene dichloride,
   b. about 2–5% by weight of a polyamide - epichlorohydrin resin,
   c. about 3–10% by weight of an amphoteric metal salt selected from the group consisting of soluble salts of zinc, iron, aluminum and lanthanum,
   d. the remainder of said composition being water.

2. A composition as recited in claim 1 further comprising a silicate material.

3. A composition as recited in claim 2 wherein said silicate comprises sodium metasilicate.

4. A composition as recited in claim 1 wherein said amphoteric metal salt comprises zinc chloride.

5. A process for controlling pollution and contamination in paint, lacquer or enamel spray booths in which water is used to wash air in said booth, and to remove over-sprayed paints, enamels or lacquers, said water being recirculated for further use in washing the air in said spray booths, said process comprising adding to said water an effective amount for the purpose of a detackifying composition comprising a polymer formed by reaction of hexamethylenediamine and ethylene dichloride, a polyamide-epichlorohydrin resin, and an amphoteric metal salt, said amount being sufficient to reduce the tackiness of said paints, enamels and lacquers and to thereby reduce the tendency of over-sprayed paints, enamels and lacquers to adhere to pump parts, mist eliminators, or sump sidewalls of said spray booths, said composition being effective to condition paint, enamel and lacquer solids so as to facilitate removal of said solids from said water.

6. Process as recited in claim 5 wherein said composition is added to said water at a rate of between about 1–25% weight based upon the weight of said over-sprayed paint, enamel or lacquer.

7. Process as recited in claim 5 wherein said paint is an oil base paint, said process further comprising raising the pH of said water to an alkaline condition.

8. Process as recited in claim 5 comprising adding a sodium silicate salt to said water to thereby raise said pH.

* * * * *